United States Patent [19]

Inoue

[11] Patent Number: 4,504,721
[45] Date of Patent: Mar. 12, 1985

[54] 3D EDM METHOD AND APPARATUS UTILIZING A MAGNETIC FIELD

[75] Inventor: Kiyoshi Inoue, Tokyo, Japan

[73] Assignee: Inoue-Japax Research Incorporated, Yokohama, Japan

[21] Appl. No.: 311,451

[22] Filed: Oct. 14, 1981

[30] Foreign Application Priority Data

Oct. 15, 1980 [JP] Japan .......................... 55-145757[U]
Oct. 27, 1980 [JP] Japan ................................ 55-149369

[51] Int. Cl.³ .............................................. B23P 1/12
[52] U.S. Cl. .............................. 219/69 M; 204/129.6; 204/224 M; 219/69 E
[58] Field of Search ................. 219/69 M, 69 E, 69 R, 219/69 V; 204/129.1, 129.6, 224 M

[56] References Cited

U.S. PATENT DOCUMENTS 3,591,761  7/1971  Bederman et al. ................ 219/69 V

FOREIGN PATENT DOCUMENTS

| 1249436 | 10/1971 | United Kingdom . |
| 1318826 | 5/1973 | United Kingdom . |
| 1385669 | 2/1975 | United Kingdom . |
| 2052338 | 1/1981 | United Kingdom . |
| 1594995 | 8/1981 | United Kingdom . |
| 2069396 | 8/1981 | United Kingdom . |

Primary Examiner—Roy N. Envall, Jr.
Assistant Examiner—Alfred S. Keve
Attorney, Agent, or Firm—Karl F. Ross; Herbert Dubno

[57] ABSTRACT

A method of and apparatus for electroerosively machining a 3D cavity in workpiece, in which a coil is wound on a tool electrode and energized by a current source to produce a magnetic field therein. The magnetic field of flux density in excess of 100 Gauss and preferably not less than 300 Gauss is passed through the ferromagnetic electrode body and applied to the machining gap formed between the tool electrode and the workpiece which are relatively displaced multiaxially under commands of a NC unit to cause the frontal end portion of the tool electrode to sweep in a scanning manner over the workpiece while following a prescribed 3D path to progressively develop the desired cavity electroerosively machined with a succession of electrical discharges affected by the magnetic field. The energization source for the coil includes a control circuit operated by a preprogrammed set of command signals form the NC unit to sequentially modify the magnetic field in accordance with the instantaneous geometrical change of the workpiece area confronting the machining electrode face to maintain the concentration of contaminants in the gap at an optimum level.

16 Claims, 10 Drawing Figures

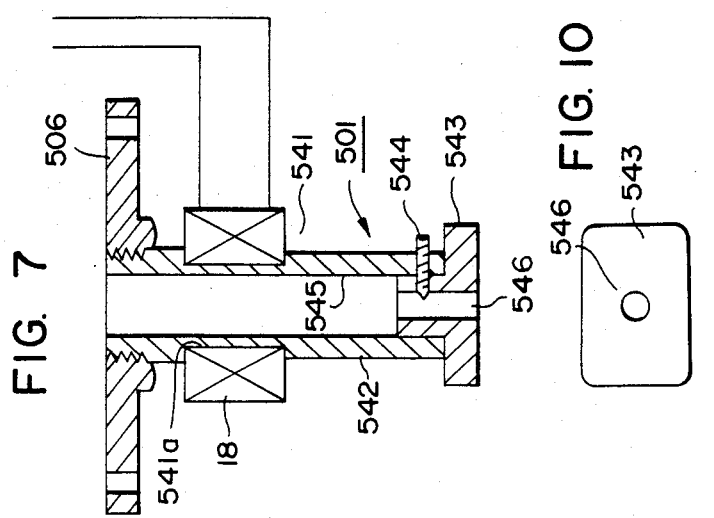
FIG. 7
FIG. 10
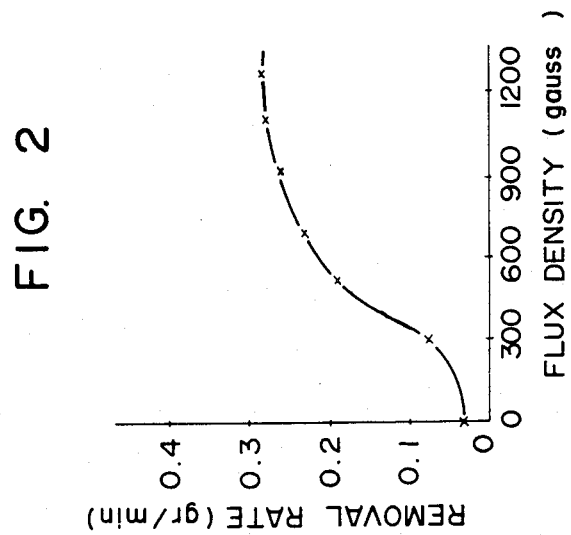
FIG. 2

3D EDM METHOD AND APPARATUS UTILIZING A MAGNETIC FIELD

FIELD OF THE INVENTION

The present invention relates generally to electroerosion and, specifically, to a method of and an apparatus for electroerosively machining a 3D (three-dimensional) cavity in a workpiece by using an axial tool electrode, e.g. a wire or rod electrode, which is generally independent not only in size but in shape of the desired cavity. The term "electroerosion" and "electroerosive machining" is used herein to refer to a machining process whereby material is removed from a workpiece juxtaposed with a tool electrode by means of the actions of a succession of electrical discharges effected therebetween, which actions may partially include actions of an electrolytic or electrochemical material dissolution nature.

BACKGROUND OF THE INVENTION

It has generally been accepted that the electroerosion technique, when applied to the machining of a 3D cavity in a workpiece, commonly requires a tool electrode three-dimensionally shaped to conform to the desired cavity in the workpiece. Thus, a conventional sinking-type or 3D EDM electrode may be a precision-machined conductive block or a sheet metal precision deformed or plated on a precision-electroforming mold. Furthermore, a multiplicity of such electrodes of identical or similar configuration must be prepared in order to compensate for the wear which the electrodes suffer during the erosion process or in the interest of minimizing the machining time to achieve the goal of a desired machined precision and surface finish. Preparation of such precision-formed and multiple electrodes is generally time-consuming and laborious or entails considerable skill and labor, and, as a consequence, may make a desired EDM job unduly costly or often even impractical.

OBJECTS OF THE INVENTION

It is accordingly a general object of the present invention to provide an improved method of electroerosively machining a 3D cavity in a workpiece.

Another object of the invention is to provide an electroerosion method of machining a 3D cavity whereby the desired cavity can be formed in a workpiece with a simple electrode tool.

Still another object of the invention is to provide an electroerosion method which is capable of yielding a desired 3D cavity in a workpiece with an increased surface finish and yet with much higher efficiency than the prior art.

A further object of the invention is to provide an improved apparatus for electroerosively machining a 3D cavity in a workpiece.

A still further object of the invention is to provide an electroerosion apparatus whereby a desired 3D cavity can be formed in a workpiece with a simple electrode tool arrangement.

Yet a further object of the invention is to provide an electroerosion apparatus which is capable of yielding a desired 3D cavity in a workpiece with an increased surface finish and yet with much higher efficiency over the prior art.

SUMMARY OF THE INVENTION

In accordance with the present invention there is provided, in a first aspect thereof, a method of electroerosively machining a three-dimensional cavity in a workpiece, which method comprises the steps of: positioning an axial tool electrode whose shape is simple and generally independent of the shape of the desired cavity to axially oppose with the workpiece and to form a machining gap between the workpiece and an end portion of the tool electrode defining a machining face therefor; flushing the machining gap with a machining liquid; magnetically activating the axial tool electrode; applying a magnetic field of flux density in excess of 100 Gauss to the machining gap through the magnetically activated tool electrode; applying successive electrical pulses between the tool electrode and the workpiece to produce through the machining gap a succession of electrical discharges affected by the magnetic field, thereby electroerosively removing material from the workpiece; and relatively displacing the tool electrode and the workpiece multi-axially while maintaining the aforementioned axial opposition of the tool electrode with the workpiece so as to cause the machining face of the axial tool electrode to sweep in a scanning manner along a predetermined three-dimensional path over the workpiece, thereby progressively forming the cavity therein.

The tool electrode may be magnetically activated by using a tool electrode composed of a magnetically permeable material to conduct a magnetic flux produced by a field generating means which may be constituted either by a permanent magnet or an electromagnet. Preferred examples of the electrode material are iron and iron-copper, iron-graphite and iron-graphite-copper alloys. The workpiece, too, is preferably composed of a magnetically permeable material and may be of a ferrous material or alloy.

Conveniently, the axial tool electrode can be positioned substantially orthogonally to a plane comprised of two coordinate axes of a three-dimensional coordinate system and the multi-axial relative displacement between the tool electrode and the workpiece is effected while maintaining this orientation so as to cause the aforesaid machining face of the axial tool electrode to sweep over the workpiece along the predetermined path defined by successive sets of three coordinates in the said coordinate system.

In the 3D EDM method just enunciated, it is thus apparent that a desired cavity acquires its shape as a result of the corresponding three-dimensional relative displacement between the tool electrode and the workpiece. Thus, the tool electrode can conveniently be of relatively simple shape, e.g. circular, square or triangular in cross section, which has no direct relationship with the desired shape of a cavity. The machining liquid may be supplied to the machining gap via a bore formed in the tool electrode or via one or more liquid delivery nozzles separately arranged in the region of the tool electrode. Where more than one tool electrodes are used, it is advantageous to feed electrical machining energy to each of the multiple electrodes individually from a separate EDM power supply to allow electrical discharges to develop uniformly over the different electrode surfaces.

In the method just described, it has been found that the rate of wear of the tool electrode or machining face thereof as well as the format of tool wear becomes particularly important. This problem arises partly due to the fact that there is a limitation to increase the machining gap. As a result, machining chips and decomposed gases tend to accumulate in the machining gap and removal of these gap products requires frequent interruptions of the machining operation, causing machining instability and resulting in an unduly prolonged total machining time. Otherwise, a damaging arc discharge will develop and hardly be eliminated.

On the other hand it has generally been accepted that the EDM gap must contain an adequate concentration of contaminants which should not be either excessive or deficient to allow electrical discharges to consecutively develop with stability and maximum material removal efficiency. In the 3D EDM arrangement just described, however, which entails relative machining displacement orthogonal to the tool orientation and a certain peculiar geometrical characteristic of the active machining area which variably develops during this relative displacement, it has been found to be difficult to maintain such an adequate concentration of contaminants in the machining gap. Furthermore, an additional investment for movement control equipment and devices such as a numerical controller and associated mechanical components which are relatively expensive is necessitated but may not be justified unless the 3D EDM method offers much more beneficial results and greater advantages than the conventional sinking-type EDM method.

The novel method herein proposed and described enables contaminants in the 3D EDM gap to be maintained at an optimum level by optimally controlling the magnitude of the gap, thereby establishing a gap condition which allows material removal to be effected at a maximum efficiency and stability and hence minimizing the total machining time required to achieve a desired cavity.

The invention also provides, in a second aspect thereof, an apparatus for electroerosively machining a three-dimensional cavity in a workpiece, which apparatus comprises: an axial tool electrode of a simple shape which is generally independent of the shape of the desired cavity; a tool support member for positioning the axial tool electrode to axially oppose with the workpiece and to form a machining gap between the workpiece and an end portion of the tool electrode defining a machining face therefor, means for supplying a machining liquid to the machining gap; field generating means for applying a magnetic field of flux density in excess of 100 Gauss to the machining gap through the tool electrode; power supply means for applying successive electrical pulses between the tool electrode and the workpiece to produce through the machining gap a succession of electrical discharges affected by the magnetic field, thereby electroerosively removing material from the workpiece; and drive means for relatively displacing the tool support member and the workpiece multi-axially while maintaining axial opposition of the tool electrode with the workpiece so as to cause the machining face of the axial tool electrode to sweep in a scanning manner along a three-dimensional path over the workpiece, thereby progressively forming the cavity therein.

BRIEF DESCRIPTION OF THE DRAWING

These and other objects, features and advantages of the present invention will become more readily apparent from the following description of certain preferred embodiments thereof made with reference to the accompanying drawing in which:

FIG. 2 is a graph representing the relationship between the flux density of a magnetic field applied to pass through the end portion of a magnetically permeable axial tool electrode and the 3D EDM removal rate;

FIGS. 5, 6 and 7 are elevational views, partly in section, diagrammatically illustrating electrode tools which may be used in the practice of the present invention; and FIGS. 8, 9 and 10 are inverted plan views as seen from below of the electrode tools of FIGS. 5, 6 and 7, respectively.

SPECIFIC DESCRIPTION

Figure 1:
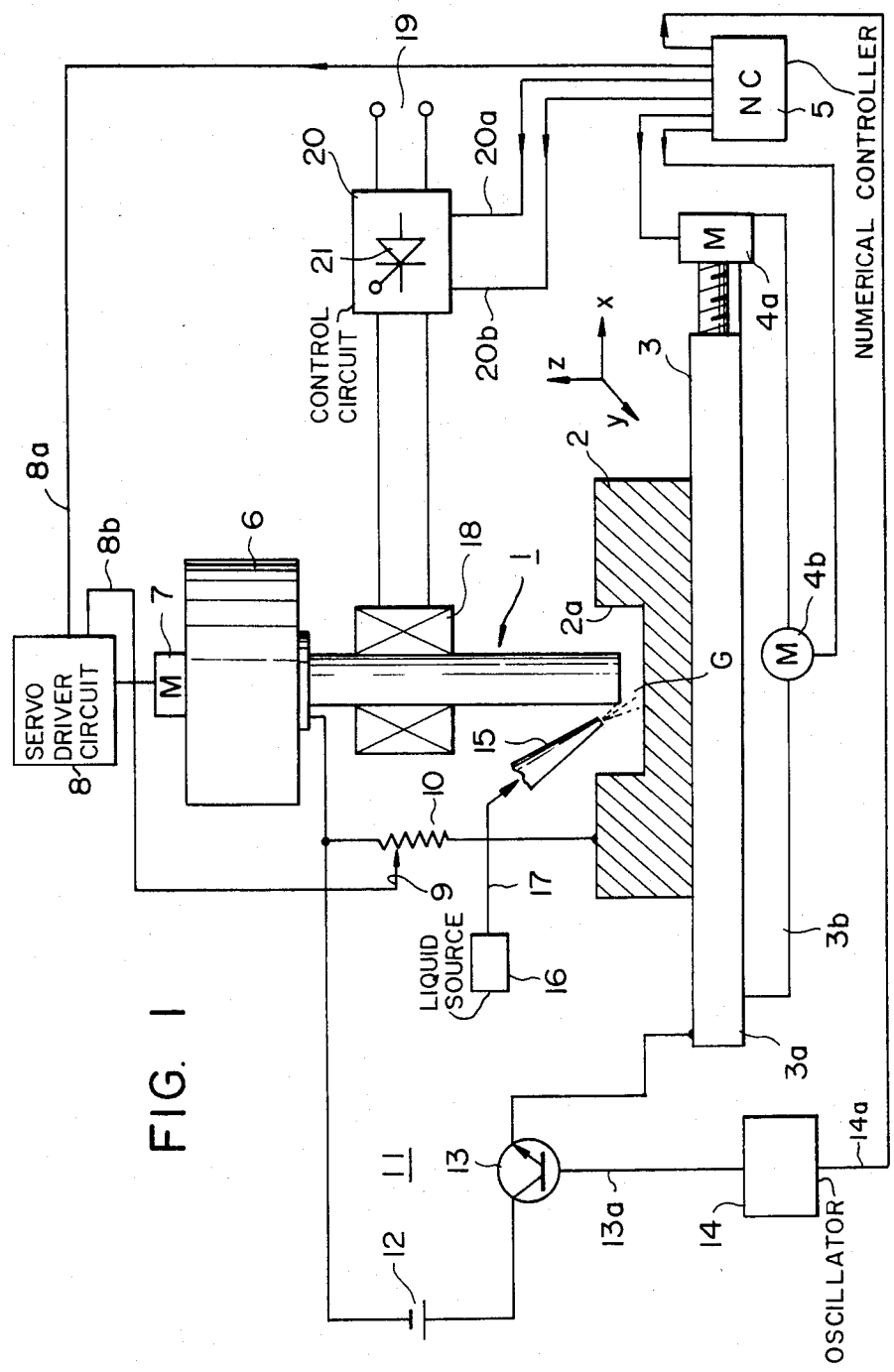
FIG. 1 is a schematic diagram, partly in a vertical sectional view and partly in a circuit-diagram form, illustrating an apparatus according to the present invention.

Referring now to FIG. 1, an axial tool electrode 1 shown in the form of a rod is positioned vertically and juxtaposed with a workpiece 2 securely mounted on a worktable 3 which is displaceable horizontally i.e. in an X-Y plane by means of a pair of motors 4a and 4b. The worktable 3 is a conventional cross-slide arrangement and comprises a pair of sub-tables 3a and 3b which are driven in the direction of the X-axis and the Y-axis by the motors 4a and 4b, respectively. The motors 4a and 4b are energized with drive signals furnished from a control unit 5 such a numerical controller or NC unit.

The tool electrode 1 axially extends orthogonally to the X-Y plane and is securely supported by a tool head 6 displaceable vertically by a servo motor 7. The motor 7 thus drives the tool head 6 to displace the tool electrode 1 axially i.e. in the direction of a Z-axis orthogonal to the X-Y plane. The motor 7 is energized by an output signal of a driver circuit 8 which has a first input 8a connected to the NC unit 5 and a second input 8b leading from a tap 9 of a sensing resistor 10 connected electrically between the tool electrode 1 and the workpiece 2. When a short-circuiting or arcing condition in the gap G is detected by the sensing tap 9 and thus an abnormality signal developed through the input 8b, the control driver circuit 8 operates to temporarily block the effect of the drive signal incoming through the input 8a.

An EDM power supply 11 of conventional design comprises a DC source 12 having a pair of output terminals one of which is electrically connected to the tool electrode 1 and the other of which is electrically connected to the electrically conductive table 3a via a power switch 13 shown constituted by a transistor. The switch 13 has a control input 13a leading from the output of an oscillator 14, e.g. multivibrator. The oscillator in turn has a control input 14a leading from the NC unit 5. The oscillator 14 operates to furnish the power switch 13 with a succession of signal pulses. As the switch 13 is turned on and off alternately, the output of the DC source is pulsed and successive power pulses are applied between the tool electrode 1 and the workpiece 2 to produce a succession of electrical discharges through a machining gap G flooded with a machining liquid, thereby electroerosively removing material from the workpiece 2.

The machining liquid is here preferably constituted by a water liquid, i.e. distilled water, having a specific resistance in the range between $10^3$ and $10^5$ ohm-cm and is supplied to the machining gap G by a nozzle 15 connected to a liquid source 16 via a conduit 17.

A coil 18 is wound on the tool electrode 1 and energized by a current source 19. Between the source 19 and the coil 18 there is provided a control circuit 20 including a switch 21 which may be constituted by a thyristor as symbolically shown to control the energizing current applied to the coil 18. The control circuit 20 has a pair of inputs 20a and 20b both leading from the NC unit 5. The first input 20a may be furnished with a command signal from the NC unit 5 to control the amplitude of the energizing current for the coil 18. The second input 20b may be likewise furnished to control the switching parameters, e.g. frequency, of the coil-energizing current when pulsed by the switch 21.

The tool electrode 1 is composed of a material which is magnetically permeable and should at the same time provide a good erosion-machining performance. Preferred examples of such a material are iron, iron-copper alloy, iron-graphite alloy and iron-graphite-copper alloy and thus should generally be ferrous materials or alloys. With the coil 18 energized, a magnetic field is established therein and conducted to the machining gap G through the magnetically permeable tool electrode 1. Thus, the tool electrode 1 magnetically activated by the energization of the coil 18 serves as a field concentrater for the magnetic field set up in the coil 18 and to apply it locally to the machining gap G.

The magnetic field established through the tool electrode should be of flux density in excess of 100 Gauss, preferably not less than 300 Gauss. In FIG. 2 there is shown a graph illustrating the criticality of the strength of the magnetic field applied through the tool electrode to the machining gap versus the removal rate in a typical EDM operation. In the operation, a ferrous workpiece was machined with a ferrous tool electrode and with EDM pulse parameters adjusted to yield an EDM surface roughness of 14 $\mu$Rmax. In the graph, the abscissa represents the flux density of the magnetic flux which develops at the frontal end portion of the tool electrode and the ordinate represents the EDM removal rate which results. It is seen that removal rate rises sharply when the flux density exceeds 300 Gauss.

The NC unit 5 is provided to serve multiple functions and to serve as a central controller for the total machining system.

The NC unit 5 is arranged to furnish drive signals for the motors 4a and 4b for driving the cross-sliding sub-tables 3a and 3b to displace the workpiece 2 in an X-Y or horizontal plane. At the same time, a drive signal is furnished form the NC unit 5 to the motor 7 via the control circuit 8 to drive the tool head 6, thereby displacing the tool electrode 1 along its axis i.e. the Z-axis orthogonal to the X-Y plane. The NC unit 5 has thus a set of coordinate data preprogrammed therein to correspond to a path of 3D movement between the tool electrode 1 and the workpiece 2 prescribed to produce a desired cavity 2a in the workpiece 2. The data are reproduced during machining operations and converted into drive signals applied to the motors 4a, 4b and 7 to cause the machining end portion of the tool electrode 1 and the workpiece 2 to precisely follow the prescribed path of 3D relative movement. Thus, the machining end portion in following the prescribed path is swept in a scanning manner over the workpiece 2 to progressively form the desired cavity 2a three-dimensionally.

The NC unit 5 is further arranged to furnish a programmed set of control signals which are sequentially applied to the signal pulser 14 to allow the latter to produce sequential changes of the machining pulse parameters as programmed.

In accordance with the present invention, the NC unit 5 is still further arranged to furnish a programmed set of control signals for the energization current applied from the source 19 to the coil 18 to establish a magnetic field. Thus, the changing shape, dimension, inclination and like geometrical characteristics of the surface portion of the workpiece 2 which the machining end portion of the tool electrode 1 encounters during the 3D relative displacement are taken into account and a set of particular magnitudes and/or particular formats of the magnetic field are established and preprogrammed in the NC unit 5 in conjunction with these geometrical changes of the machining area which are anticipated. This will allow the machining gap G instantaneously to be maintained at an optimum size and to contain an optimum concentration of machining contaminants as required to maintain an optimum machining stability, irrespective of consecutive geometrical changes in the machining area. Surprising, it has been found that a fine-finish machining operation designed to yield a surface roughness as fine as 3 $\mu$Rmax, which could not previously be carried out without very frequent interruption due to a reduced concentration of gap contaminants can be achieved smoothly and practically without interruption.

Figure 3:
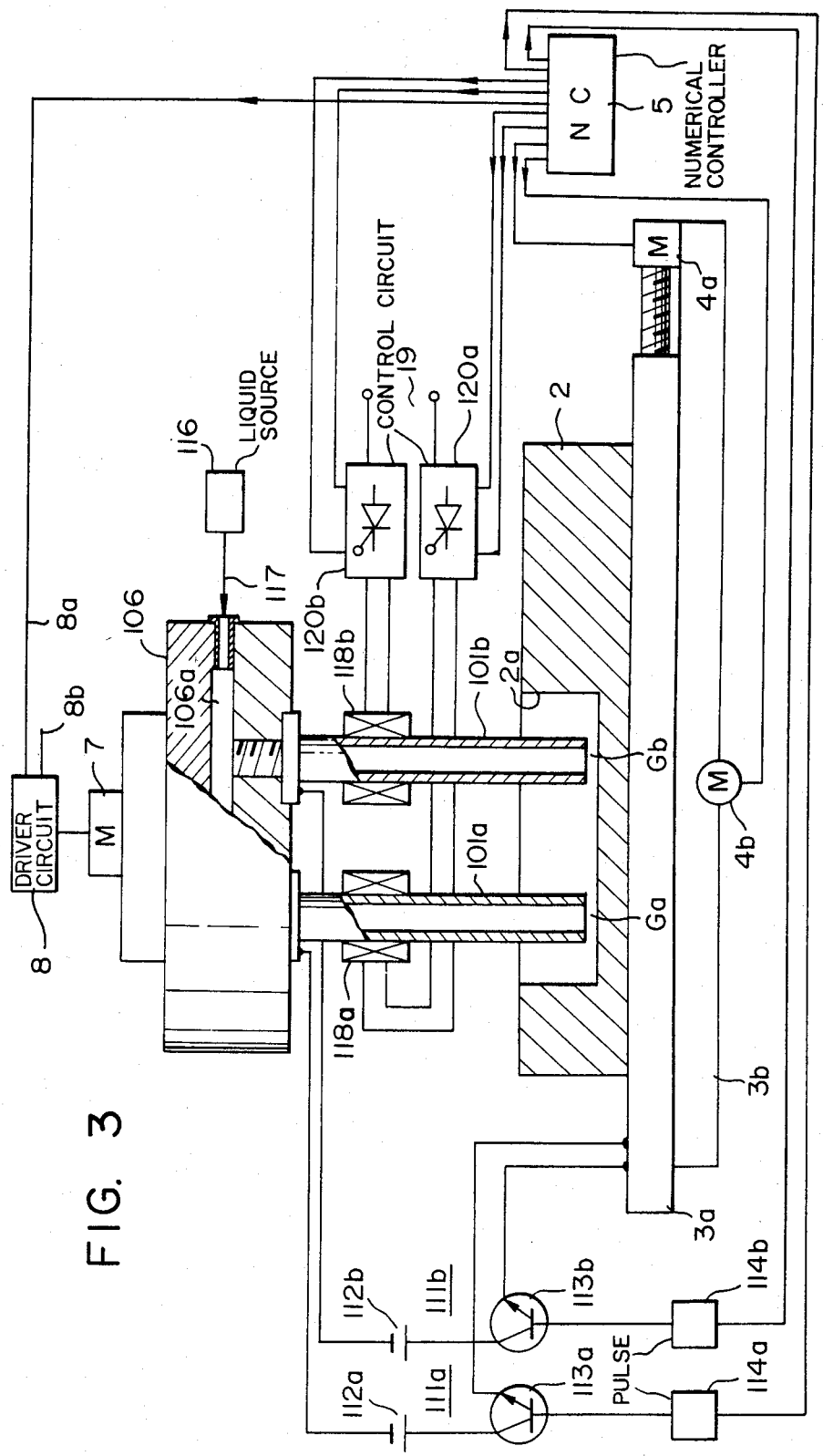
FIG. 3 is a diagram, similar to that of FIG. 1, illustrating a 3D EDM apparatus according to the invention utilizing a plurality of tubular tool electrodes.

In the embodiment of FIG. 3, a plurality, shown by two, of magnetically permeable or ferromagnetic tool electrodes 101a and 101b, each shown in the form of a pipe, are supported by a common tool head 106 which is displaceable vertically by the motor 7 driven by a driver circuit 8 under command of signals from the NC unit 5 as in the embodiment of FIG. 1. Here again, a workpiece 2 is also securely mounted on the worktable 3 comprising cross-sliding sub-tables 3a and 3b driven by motors 4a and 4b under commands of the NC unit 5.

The two tool electrodes 101a and 101b shown in FIG. 3 are designed to be energized respectively by two separate EDM power supply circuits 111a and 111b, each comprising a DC source 112a, 112b, a power switch 113a, 113b, and a signal pulser 114a, 114b and each functioning essentially in the same manner as previously described. The two electrodes 101a and 101b have coils 118a and 118b wound respectively thereon and energized by a common current source 19 via control circuits 120a and 120b, respectively, each of which is of a type and has a pair of inputs leading from the NC unit 5, as in FIG. 1.

In the arrangement of FIG. 3, a machining-liquid source 116 is connected via a conduit 117 with a chamber 106a formed in the tool head 106, the chamber communicating with the internal bores of the tubular electrodes 101a and 101b, to supply the machining liquid into the two machining gaps Ga and Gb therethrough. The energization-current control circuit 120a, 120b provided for each coil 118a, 118b, is fed with each individual set of preprogrammed command signals from the NC unit 5 to produce through each tool electrode 101a, 101b a magnetic field which sequentially varies in accordance with the changing shape, dimension, inclination and like geometric characteristics of the particular machining portion of the workpiece 2 confronting the particular electrode. Likewise, the EDM pulse parameter control circuit 114a, 114b is provided for each power supply 111a, 111b and for each tool electrode 101a, 101b.

Figure 4:
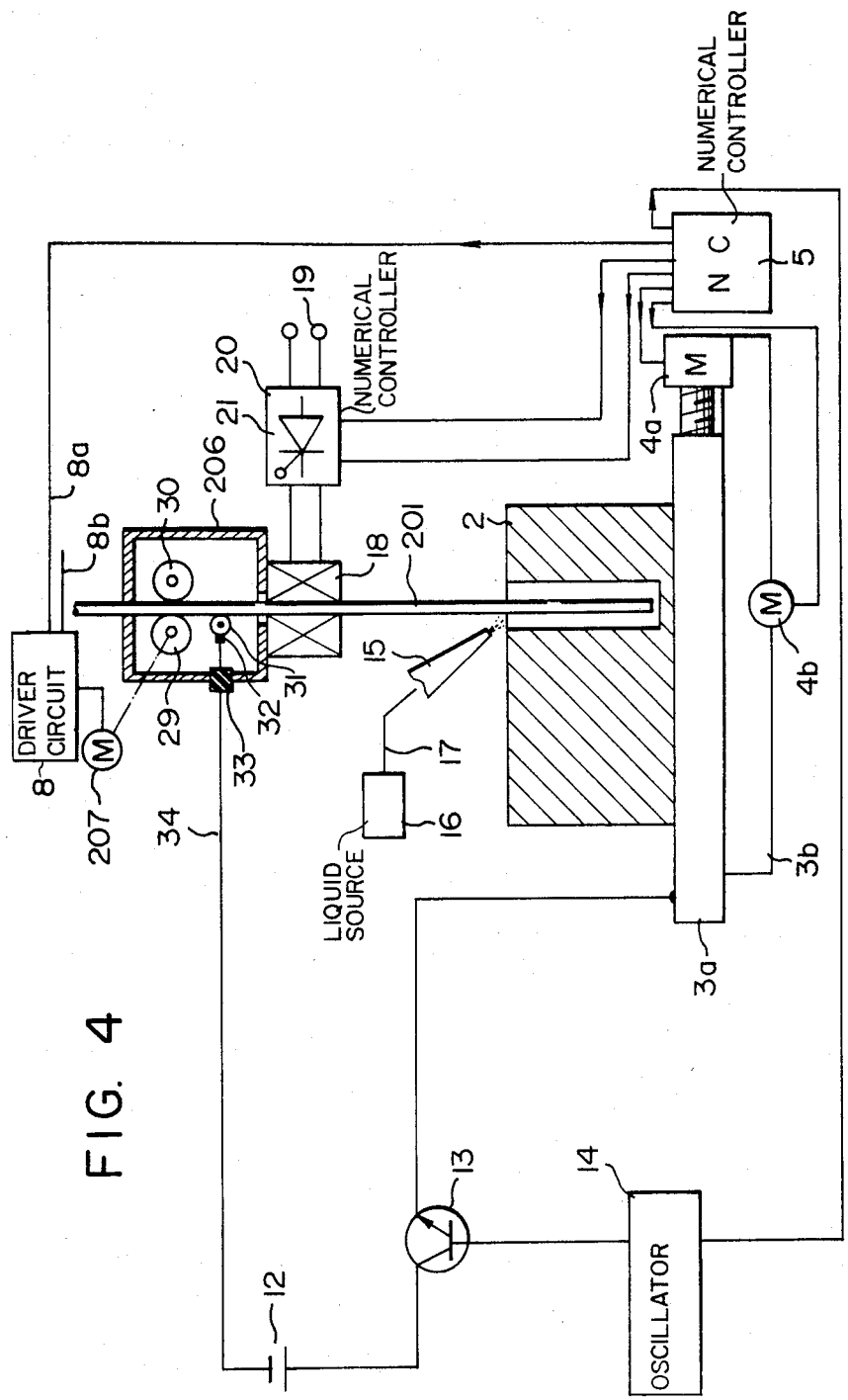
FIG. 4 is a similar diagram illustrating a 3D EDM apparatus according to the invention utilizing a continuous wire electrode.

In FIG. 4 in which same reference numerals as those in FIGS. 1 and 3 are used to designate same or similar functional parts, there is shown a further embodiment of the invention which utilizes the axial tool electrode in the form of a continuous wire 201 composed of a ferrous alloy or material. The wire electrode 201 is fed from a supply (not shown) and arranged to pass through a tool head 206 in which a capstan 29 and a pinch roller 30 are provided to drive the wire electrode 201 along its longitudinal axis or in the direction of a Z-axis. The capstan 29 is driven by a motor 207 rotated in response to a drive signal of the control driver circuit 8. The latter combines a programmed Z-axis drive command incoming through the input 8a from the NC unit 5 and a gap responsive electrode wear signal incoming through the input 8b to produce the control drive signal and apply it to the motor 207. Within the tool head 206 a current conducting roller 31 is biased against the wire electrode 201 and has a conducting brush 32 electrically connected to one output terminal of the DC source 12. An insulating sleeve 33 is fitted in the wall of the tool head 206 to lead in the connecting conductor 34.

In FIGS. 5 through 10, there are shown modified forms of the electrode tool 301, 401 and 501 which may be used in embodying the present invention.

Figure 5:
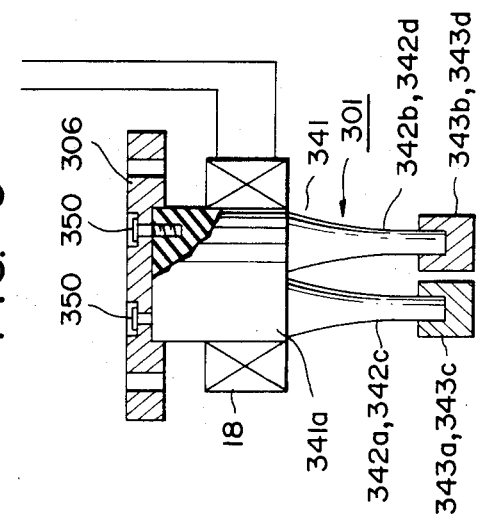
Figure 8:
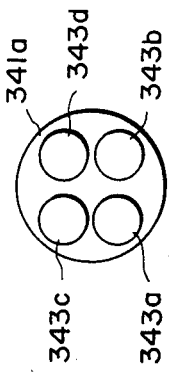

The electrode tool 301 of FIGS. 5 and 8 comprises a body portion, composed of a ferromagnetic material 341, which consists of a cylinder 341a and four forwardly converging frustcones 342a to 342d attached thereto. Each frustcone 342a, 342b, 342c, 342d of ferromagnetic material, e.g. iron-copper alloy, has small cylindrical tip 343a, 343b, 343c, 343d of a paramagnetic material, e.g. copper, individually attached to the forward end portion thereof. The base cylinder 341a has the coil 18 wound thereon and is secured to a tool head 306 by means of bolts 350.

Figure 6:
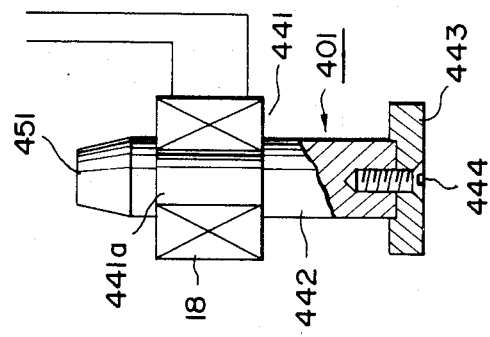
Figure 9:
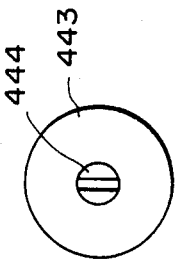

The electrode tool 401 shown in FIGS. 6 and 9 comprises a body portion 401, again composed of a ferromagnetic material, which consists of a first cylinder 441a of a reduced diameter on which the coil 18 is wound and a second cylinder 442 having a disk tip 443 of an enlarged diameter attached to the forward end portion thereof by a screw 444. The tip 443 is again composed of a paramagnetic material and the body portion 441 has the tapered upper end 451 for fitting in an attachment recess of the tool head (not shown).

The electrode tool 541 shown in FIGS. 7 and 10 comprises a cylindrical body portion 501, again composed of a ferromagnetic material, which has a portion of reduced diameter 541a on which the coil 18 is wound and a lower cylinder portion 542 into which a paramagnetic tip 543 is fitted and secured by a screw 544. The cylinder 541 is formed with an internal bore 545 and the tip 543 is formed with a central bore 546 opening into the bore 545 so as to permit the machining liquid to be delivered to the machining gap through these formations 545 and 546. An electrode attachment flange 506 is screwed onto the body portion 541 at is upper end and provides means for fitting the electrode onto a tool head.

What is claimed is:

1. A method of electroerosively machining a three-dimensional pattern in a workpiece, comprising the steps of:
   positioning an axial tool electrode having a simple shape which in cross section is generally independent of and dissimilar to a desired shape of said pattern, so as to axially oppose with the workpiece and to form a machining gap between said workpiece and an end portion of said tool electrode defining a machining face;
   flushing said machining gap with a machining liquid;
   applying a magnetic field of flux density in excess of 100 Gauss to said machining gap proximate said machining face selectively through said tool electrode;
   applying successive electrical pulses between said tool electrode and said workpiece to produce through said machining gap a succession of electrical discharges affected by said magnetic field, thereby electroerosively removing material from a localized portion of said workpiece which is opposed with said machining face; and
   maintaining said electrical discharges while relatively displacing said tool electrode and said workpiece multi-axially and with displacement in two mutually perpendicular directions and while maintaining said axial opposition of the tool electrode with the workpiece so as to cause said machining face and said gap traversed by said magnetic field to sweep in a scanning manner along a predetermined three-dimensional path corresponding to said desired pattern to successively shift therealong said region of localized material removal over said workpiece, thereby progressively forming said pattern therein so that said magnetic field participates in the removal of material from said workpiece across from said tool electrode.

2. The method defined in claim 1 wherein said magnetic field is of flux density in excess of 300 Gauss.

3. The method defined in claim 1 wherein said magnetic field is a pulsed field.

4. The method defined in claim 1, further comprising the step of controlling said magnetic field to sequentially alter at least one parameter thereof in accordance with a changing instantaneous geometry of the machining area of said workpiece confronting said machining face of the tool electrode.

5. The method defined in claim 4 wherein said parameter is the intensity of said magnetic field.

6. The method defined in claim 4 wherein said magnetic field is applied in the form of a succession of magnetic pulses and said parameter is the frequency of said pulses.

7. The method defined in claim 1 wherein said tool electrode is composed of a ferrous material.

8. The method defined in claim 1 wherein said tool electrode is composed of a ferrous alloy selected from the group which consists of iron-copper, iron-graphite and iron-graphite-copper alloys.

9. The method defined in claim 1, wherein said tool electrode comprises a body portion composed of a ferromagnetic material and said end portion in the form of a tip attached to said body portion and composed of a paramagnetic material.

10. An apparatus for electroerosively machining a three-dimensional pattern in a workpiece comprising:

an axial tool electrode having a simple shape which in cross section is generally independent of and dissimilar to a desired shape of said pattern;

tool support means for positioning said axial tool electrode to axially oppose with the workpiece and to form a machining gap between said workpiece and an end portion of said tool electrode defining a machining face therefor;

means for supplying a machining liquid into said machining gap;

field generating means for applying a magnetic field of flux density in excess of 100 Gauss to said machining gap proximate said machining face selectively through said tool electrode;

power supply means for applying a successive electrical pulses between said tool electrode and said workpiece to produce through said machining gap a succession of electrical discharges affected by said magnetic field, thereby electroerosively removing material from a localized portion of said workpiece which is opposed with said machining face; and drive means for relatively displacing said tool support means and said workpiece multi-axially and with displacement in two mutually perpendicular directions while maintaining axial opposition of the tool electrode with the workpiece so as to cause said machining face and said gap traversed by said magnetic field to sweep in a scanning manner along a three-dimensional path corresponding to said desired pattern to successively shift therealong said region of localized material removal over said workpiece, thereby progressively forming said desired pattern therein so that said magnetic field participates in removal of material from said workpiece across from said tool electrode.

11. The apparatus defined in claim 10 wherein said tool electrode is composed of a ferrous material.

12. The apparatus defined in claim 10 wherein said tool electrode is composed of a ferrous alloy selected from the group which consists of iron-copper, iron-graphite and iron-graphite-copper alloys.

13. The apparatus defined in claim 10 wherein said field generating means comprises at least one coil wound on said tool electrode and energized by a current source.

14. The apparatus defined in claim 13 wherein said tool electrode comprises a body portion detachably secured to said tool support means and composed of a ferromagnetic material and said end portion in the form of a tip is securely attached to said body portion and composed of a paramagnetic material, said body portion having said coil wound thereon.

15. The apparatus defined in claim 10, further comprising means for controlling said magnetic field to sequentially alter at least one parameter thereof in accordance with a changing instantaneous geometry of the machining area of said workpiece confronting said end portion of said tool electrode.

16. An EDM method of machining a desired pattern in an electrically conductive workpiece with an axial tool electrode having a machining surface which in cross-sectional contour is generally independent of the desired pattern, the method comprising the steps of:

axially juxtaposing said axial tool electrode with the workpiece to position said machining surface in a spaced juxtaposition therewith across an EDM gap supplied with a machining liquid;

applying a magnetic field of a flux density in excess of 100 Gauss to said machining gap through said axial tool electrode;

applying successive electrical pulses between said tool electrode and said workpiece to produce through said machining gap a succession of electrical discharges affected by said magnetic field, thereby electroerosively removing material from a localized portion of the workpiece juxtaposed with said machining surface; and effecting a multi-axial machining feed displacement and with displacement in two mutually perpendicular directions between the tool electrode and the workpiece along a predetermined three-dimensional path which corresponds to said desired pattern so that said magnetic field participates in directing removal of material at portions of said workpiece juxtaposed with said tool electrode.

* * * * *